United States Patent Office 2,828,301
Patented Mar. 25, 1958

2,828,301

METAL-CONTAINING AZO DYESTUFFS

Robert Frederic Michel Sureau, Enghien-les-Bains, and Jean Leon Adrien Rollet, Paris, France, assignors to Compagnie Francaise des Matieres Colorantes, Paris, France, a French company No Drawing. Application March 25, 1955
Serial No. 496,924

Claims priority, application France March 26, 1954

1 Claim. (Cl. 260—146)

The present invention concerns new metallizable and metal-containing azo dyestuffs, their preparation and applications.

In French Patent No. 1,006,409, new metallizable dyestuffs corresponding to the general formula

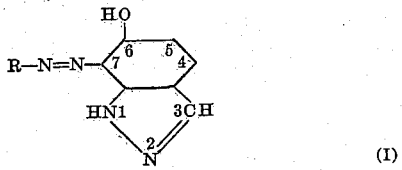

have been described, in which the indazole nucleus may have any substituents whatever in positions 4 and 5 and in which R represents a mono- or poly-sulphonated nucleus which has a metallizable group, such as —OH, —COOH, —OCH$_2$COOH, —NH$_2$ or >NH, in the ortho position to the azo radical.

These dyestuffs can be used for dyeing wool, leather, the casein fibre sold under the trade name Lanital, animalized cellulosic fibres and superpolyamides, by the technique customarily used for acid dyestuffs. The color obtained is capable of being metallized by subsequent treatment in a solution containing a metallizing agent, such as a bichromate or a salt of copper, nickel or cobalt. These dyestuffs may equally be used in the form of metalliferous complexes. These complexes are capable of dyeing the same fibres, but they require the use of a strongly acid bath which is not always gentle enough to the material to be dyed.

However, it has now been found that the azo dyestuffs corresponding to the general formula:

$$X—A—N=N—B \qquad (II)$$

in which A represents a member selected from the group consisting of the unsubstituted o-phenylene nucleus and its derivatives containing in the positions other than that occupied by X substituents which do not confer solubility, X represents a member selected from the group consisting of the OH and COOH groups, B represents the residue of a hydroxy-indazole derivative selected from the members of the group consisting of 5-hydroxy-indazole, 6-hydroxy-indazole, and their derivatives containing substituents which do not confer solubility are capable of furnishing metalliferous complexes of great value which are particularly suitable for dyeing wool and superpolyamides in a neutral bath or in a bath containing a low proportion of organic acid. Among the substituents not conferring solubility, which may be present in the hydroxy-indazole derivatives, there may be mentioned halogen atoms, nitro, sulphonamide, acylamino, and alkylsulpho groups or other analogous groups.

The present invention includes the preparation of the azo dyestuffs corresponding to the general Formula II; they are obtained by diazotisation of the ortho-aminophenols or of the ortho-aminobenzene-carboxylic acids, which may contain substituents which do not confer solubility such as halogen atoms, or nitro, sulphonamido, acylamino or alkylsulpho groups or other analogous groups and coupling of the diazo derivatives so obtained with 5-hydroxy-indazole or 6-hydroxy-indazole or their substitution products in which the substituents do not confer solubility, which have free at least the 4 position or the 7 position according to whether a derivative of 5-hydroxy-indazole or 6-hydroxy-indazole is concerned.

The invention also includes the mono-azo dyestuffs thus obtained and their conversion into metalliferous complexes, for example by any of the generally known methods.

Among the metalliferous complexs thus obtained, the chromium or cobalt derivatives are particularly interesting. They may be prepared, for example, by means of an agent capable of providing chromium or cobalt, by action of that agent on the azodyestuffs in their aqueous or aqueous-alcoholic solution and at an alkaline pH. The agents capable of providing chromium or cobalt may be, for example, complex salts of chromium or cobalt of the 2-hydroxy acids of the aliphatic series, such as tartaric acid, lactic acid, citric acid, or of the o-hydroxycarboxylic acids of the aromatic series, such as salicylic acid, cresotic acids, or 2-hydroxynaphthalene-3-carboxylic acid. The metallization can also take place, for example, in the presence of organic solvents, of amides or ammonium salts of carboxylic acids or amino acids.

On the other hand, the dyestuffs of the general Formula II can also form mixed metalliferous complexes by the action of a metallizing agent on an equimolecular mixture of two dyestuffs of the type II, but with different substituents, or of one dyestuff of type II with another metallizable dyestuff.

The new metalliferous complexes obtained according to the above described processes also form part of the invention. In a neutral or weakly acid bath they have a good affinity for wool, silk, Lanital, animalized cellulosic fibres and superpolyamides; they can also be used, for example, for dyeing leather, varnishes or plastic materials.

The invention will be more clearly understood by reference to the following examples, which are purely illustrative and in which, except when otherwise indicated, the parts given are parts by weight.

*Example 1*

18.8 parts of 2-amino-4-sulphonamido-phenol are dissolved in 100 parts of water together with 25 parts by volume of concentrated hydrochloric acid; the solution is cooled to 5° C. and diazotized with a solution of sodium nitrite corresponding to 6.9 parts. The diazo compound is neutralised by the addition of sodium carbonate and the suspension is poured into a solution of 13.4 parts of 6-hydroxy-indazole in 100 parts of water together with 6 parts by volume of 30% soda lye. After agitating for two hours, the dyestuff is dried at 50° C.

The dyestuff thus obtained is dissolved in 600 parts of warm water and chromed by boiling under reflux for 4 hours with a solution of sodium chromotartrate whose pH is adjusted to about 11 and which contains 16 parts of tartaric acid and 56 parts by volume of a solution of chromium sulphate containing 50 g. of chromium per litre.

The chromiferous dyestuff is isolated by salting out. From an acid bath containing acetic acid, it dyes wool in violet shades characterized by very good fastness.

*Example 2*

14.3 parts of 4-chloro-2-aminophenol are dissolved in 100 parts of water together with 25 parts by volume of concentrated hydrochloric acid; the solution is cooled to 5° C. and diazotized with a solution of sodium nitrate corresponding to 6.9 parts. The diazo compound is neutralized by the addition of sodium carbonate and the suspension is poured into a solution of 13.4 parts of 5-hydroxy-indazole in 100 parts of water together with 6 parts by volume of 30% soda lye. After agitating for three hours, the dyestuff is dried at 40–50° C.

The dyestuff so obtained is dissolved in 600 parts of warm water and chromed by heating with 200 parts of a solution of sodium chromosalicylate, adjusted to a pH of about 11 and corresponding to 7.6 parts of chromium sesquioxide; the mixture is heated at the boiling temperature until the formation of the complex is complete, that is, for about half an hour.

The chromiferous dyestuff obtained, isolated by salting out, is in the form of a violet-brown powder which from an acid bath containing acetic acid dyes wool in violet tones which all show very good fastness.

Example 3

15.4 parts of 4-nitro-2-aminophenol are dissolved in 100 parts of water together with 25 parts by volume of concentrated hydrochloric acid, the solution is cooled to 5° C. and diazotized with a solution of sodium nitrate corresponding to 6.9 parts. The diazo compound is neutralized by the addition of sodium carbonate and the suspension is poured into a solution of 13.4 parts of 6-hydroxy-indazole in 100 parts of water together with 6 parts by volume of 30% soda lye. After agitating for three hours, the dyestuff is dried at 40–50° C.

The dyestuff thus obtained, after being dissolved in 600 parts of warm water, is treated with a solution of sodium cobalto-tartrate brought to a pH of about 11 and containing 16 parts of tartaric acid and 46 parts by volume of a solution of cobalt sulphate containing 66 g. of cobalt per litre. After 4 hours boiling under reflux, the dyestuff complex, which has precipitated, is filtered. From a neutral bath it dyes wool and nylon in vivid and very fast bordeaux shades.

Example 4

17.1 parts of the sodium salt of the dyestuff of the preceding example together with 17.6 parts of the sodium salt of the dyestuff obtained from diazotized 4-nitro-2-aminophenol and β-naphthol are mixed with 800 parts of warm water. There is then added a solution of sodium chromotartrate brought to about pH 11 and containing 16 parts of tartaric acid and 56 parts by volume of a solution of chromium sulphate containing 50 g. of chromium per litre. The mixture is heated under reflux for 4 hours and, after salting out, the dyestuff is filtered.

The mixed chromiferous dyestuff obtained colors wool, from a neutral bath, in red-brown shades showing very good fastness.

Example 5

19.9 parts of 4:6-dinitro-2-aminophenol are dissolved in 100 parts of water together with 25 parts by volume of concentrated hydrochloric acid; the solution is cooled to 5° C. and diazotized with a solution of sodium nitrate corresponding to 6.9 parts. The diazo compound is neutralized by the addition of sodium carbonate and the suspension is poured into a solution of 13.4 parts of 6-hydroxy-indazole in 100 parts of water together with 6 parts by volume of 30% soda lye. After 4 hours agitation, the dyestuff is dried at 40–50° C.

The dyestuff obtained is treated with a solution of sodium cobalto-tartrate in the same way as in Example 3. A metalliferous dyestuff is obtained which, from a neutral bath, dyes wool and nylon in violet shades showing very good fastness.

Example 6

13.7 parts of anthranilic acid, first dissolved in 100 parts of water together with 25 parts by volume of concentrated hydrochloric acid, are diazotized at 5° C. with a solution of sodium nitrate corresponding to 6.9 parts. After neutralization by means of sodium carbonate, the diazo compound is poured into a solution of 13.4 parts of 6-hydroxy-indazole in 100 parts of water together with 6 parts by volume of 30% soda lye. After 4 hours agitation, the dyestuff is dried at 50–60° C. The dyestuff obtained is chromed by means of a solution of sodium chromosalicylate as in Example 2.

The chromiferous dyestuff, from a neutral or feebly acid bath containing acetic acid, dyes wool in orange shades possessing very good general fastness.

Example 7

21.6 parts of 2-amino-5-sulphonamido-benzoic acid, previously dissolved in 100 parts of water together with 25 parts by volume of concentrated hydrochloric acid, are diazotized at 5° C. with a solution of sodium nitrite corresponding to 6.9 parts. After neutralization by sodium carbonate, the diazo compound is poured into a solution of 13.4 parts of 6-hydroxy-indazole in 100 parts of water together with 6 parts by volume of 30% soda lye. After 4 hours agitation, the dyestuff is dried at 40–50° C.

The dyestuff is chromed by means of a solution of sodium chromosalicylate as in Example 2.

The chromiferous dyestuff, from a neutral bath or a bath feebly acid with acetic acid, dyes wool in orange shades possessing very good general fastness.

Example 8

The dyestuff, prepared according to Example 7, but treated with a solution of sodium cobalto-tartrate as in Example 3, provides a complex which, from a neutral bath, dyes wool in a very vivid and very fast raspberry shade.

The following table summarizes the preceding examples and cites some other analogous examples.

| Example No. | Compound diazotized | Coupling compound | Shade on wool of the chromium complex | Shade on wool of the cobalt complex |
| --- | --- | --- | --- | --- |
| 1 | 2-amino-4-sulphonamido-phenol | 6-hydroxyindazole | violet | |
| 2 | 4-chloro-2-aminophenol | 5-hydroxyindazole | do | |
| 3 | 4-nitro-2-aminophenol | 6-hydroxyindazole | | vivid bordeaux. |
| 4 | 4-nitro-2-aminophenol + 2-amino-4-nitrophenol | 6-hydroxyindazole β-naphthol | red-brown | |
| 5 | 4:6-dinitro-2-aminophenol | 6-hydroxyindazole | | red-violet. |
| 6 | anthranilic acid | do | | |
| 7 | 2-amino-5-sulphonamido-phenol | do | orange | do |
| 8 | do | do | | vivid-raspberry. |
| 9 | 5-nitro-2-aminophenol | do | red-violet | |
| 10 | 4-chloro-2-aminophenol | do | do | |
| 11 | 4-nitro-2-aminophenol | 5-hydroxyindazole | chocolate-brown | |
| 12 | do | 6-hydroxyindazole | brown violet | |
| 13 | 4:6-dinitro-2-aminophenol | do | violet brown | |
| 14 | 4-chloro-2-aminophenol | do | | brown. |
| 15 | 4-nitro-2-aminophenol | 5-hydroxyindazole | | violet. |

We claim:

A dyestuff being a complex of a metal selected from the group consisting of chromium and cobalt with a mono-azo dyestuff selected from the class of mono-azo dyestuffs having the following formulae:

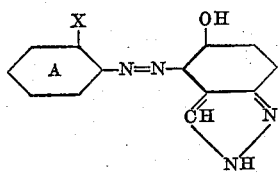

and

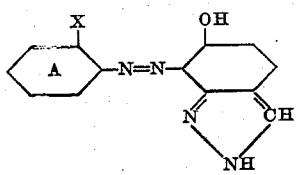

in which X represents a member selected from the group consisting of the OH and COOH metallizable groups, and the o-phenylene nucleus A is substituted by at least one member of the group consisting of the chlorine and bromine atoms and the nitro and sulphonamido groups, which complex contains one atom of metal per 2 molecules of mono-azo-dyestuff.

References Cited in the file of this patent

UNITED STATES PATENTS

| | | |
|---|---|---|
| 2,315,220 | Petitcolas | Mar. 30, 1943 |
| 2,432,419 | Heimbach | Dec. 9, 1947 |
| 2,479,944 | Lewis | Aug. 23, 1949 |
| 2,671,775 | Hanhart | Mar. 9, 1954 |
| 2,753,334 | Buehler et al. | July 3, 1956 |

FOREIGN PATENTS

| | | |
|---|---|---|
| 1,006,409 | France | Jan. 23, 1952 |